Aug. 27, 1935.    W. H. FARR    2,012,305
BRAKE DRUM
Filed May 19, 1932
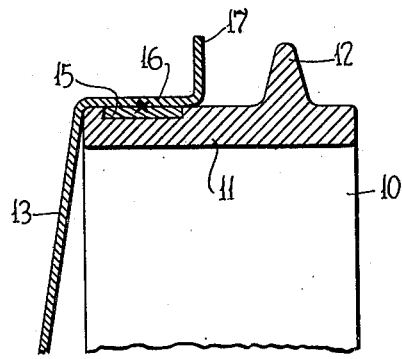
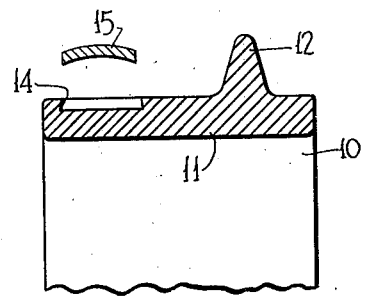
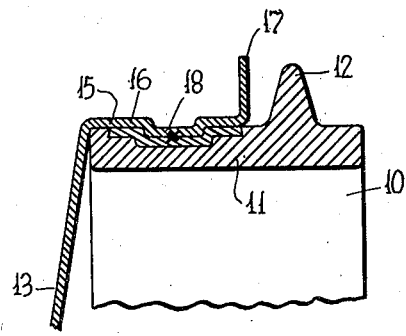
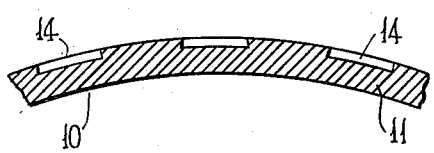
INVENTOR
WARREN H. FARR
BY John P. Tarbox
ATTORNEY Patented Aug. 27, 1935

2,012,305

UNITED STATES PATENT OFFICE 2,012,305

BRAKE DRUM

Warren H. Farr, Detroit, Mich., assignor to Budd Wheel Company, Philadelphia, Pa., a corporation of Pennsylvania Application May 19, 1932, Serial No. 612,184

8 Claims. (Cl. 188—218)

My invention relates to brake drums, and more particularly to an improved method of assembling the respective parts of a composite drum, consisting of a cast metal braking member and a pressed metal mounting member.

Welding, as a method of joining metal parts together, is accepted as one of the quickest, most generally satisfactory means in use today. While the welding together of two parts of similar material is not attended with any difficulty, the welding together of two parts of different materials, such as steel and cast iron, is somewhat difficult and not altogether satisfactory. Thus, the welding of a sheet metal mounting member directly to a cast metal braking ring does not prove entirely satisfactory.

My invention has for its object the provision of means whereby a pressed metal mounting member may be secured to a cast metal braking ring in an extremely simple and efficient manner, calculated to lend itself to production methods and practices.

Broadly, my invention resides in providing sheet metal inserts in a surface portion of a cast metal braking ring and securing a sheet metal mounting member to the braking ring through the inserts.

Other objects and advantages of my invention will be apparent after the reading of the sub-joined specification in light of the attached drawing, in which Figure 1 is a detailed sectional view of a brake drum embodying my invention.

Fig. 2 is a view similar to Figure 1 showing a modified form of the invention.

Fig. 3 is a detailed sectional view of the braking ring, showing the manner of inserting the sheet metal plugs.

Fig. 4 is a sectional elevation, showing the plug holes in the braking ring.

Fig. 5 is a plan view of the plug in Figure 3.

Referring to the drawing by reference characters, the cast braking ring is indicated generally by numeral 10, and comprises a cylindrical body portion 11 and an offset cooling and strengthening rib 12 adjacent the outer axial end thereof. A sheet metal mounting plate 13 encompasses the inner axial end of ring 10, and is flanged radially outwardly adjacent the central portion of the ring. Mounting plate 13 is secured to the braking ring 10 by means hereafter to be described.

Referring particularly to Figure 3, the braking ring 10 is provided with a series of round holes 14 in the outer surface of the body portion 11 thereof. These holes may be formed in the braking ring during the casting step by providing inserts in the mold. These holes are arranged in an annular series, equally spaced with respect to each other, and each having the wall portion thereof inclined at a re-entrant angle. According to a preferred form of my invention, I provide a corresponding number of arcuate cross section round plugs 15, known commercially as "Welch" plugs. These plugs are assembled with the ring 10 by being pressed into holes 14 and thereafter hammered in the central portion thereof to expand them. This step gives an exceedingly tight press fit between the plugs 15 and their respective holes. Inasmuch as the thickness of the plugs equals the depth of holes 14, the annular surface of the body portion 11 adjacent these holes is flush, the plugs providing no projecting parts. It will be understood that hammering the central portion of an arcuate plug in order to flatten out the same causes the plug to expand uniformly, filling up the hole into which it is fitted.

After the plugs 15 have been completely assembled with ring 10, the cylindrical axially extending portion 16 of mounting plate 13 is telescoped over the inner axial end of cast ring 10, completely concealing the plugs. Mounting plate 13 is then secured to the ring 10 by being spot welded to each of plugs 15. This spot welding may be accomplished in any well known manner. Flange 17 may be preformed, or may be turned radially outwardly after the mounting plate is welded to the plugs. This flange serves to increase the stiffness of the mounting member and to maintain continued press fit relationship between the mounting plate and the outer peripheral surface of the cast ring 10.

According to the modification in Figure 2, holes 14 are enlarged considerably and have a central depressed portion. The plugs corresponding to the holes are similarly cup shaped and are assembled in position in essentially the same manner as those shown and described in connection with Figures 1 and 3. In this modification, also, the mounting plate 13 is telescoped over the inner axial end of the braking ring 10, but the depressed portions therein corresponding to the centrally depressed portion of the plugs 15 are preferably formed by indenting the mounting plate radially inwardly. As an alternative, these depressed portions 18 may be preformed and the mounting plate as a whole may be snapped into place, depending upon the resilience of the metal to permit the cylindrical portion 16 to expand enough to be telescoped in place.

It will be seen that by providing these plugs in the outer peripheral surface of the body portion 11 to the braking ring 10, I have devised a simple yet highly efficient method for welding the pressed metal mounting plate 13 to the cast metal ring 10. A simple welding operation is all that is necessary to permanently join the two members. The novelty of the invention thus resides in the simplicity with which two members of different material may be joined together by the interposition of a third element pressed into one of the members and welded to the other.

I am aware that many modifications of my invention may be made without departing from the spirit thereof, and I do not wish to be limited to the circumstantial terminology of the specifications but rather solely by the scope of the appended claims.

What I claim is:

1. A brake drum comprising a cast braking ring having sheet metal inserts in recessed surface portions thereof exerting pressure radially of the inserts against the ring and a mounting member secured to said inserts.

2. A brake drum comprising a cast braking ring having a plurality of inverted countersunk recessed openings in the surface portion thereof, and having arcuate metal plugs in, and exerting pressure radially of the plugs against the sides of said recessed surface portions of said ring and a mounting member secured to said plugs.

3. A brake drum comprising a cast braking ring having sheet metal cup shaped inserts in a surface portion thereof exerting pressure radially of the inserts against the ring and cup shaped portions of a mounting member secured to said inserts.

4. A brake drum comprising a cast braking ring having sheet metal inserts in a surface portion thereof exerting pressure radially of the inserts against the ring, mounting member secured to said inserts, said mounting member having a stiffening flange adjacent said braking ring.

5. A brake drum comprising a cast braking ring having sheet metal inserts in a recessed surface portion thereof exerting pressure radially of the inserts against the ring.

6. A brake drum comprising a cast braking ring having recessed surface portions thereon, sheet metal inserts in said recessed portions exerting pressure radially of the inserts against the ring and a mounting member welded to said inserts.

7. A brake drum comprising a cast braking ring having a plurality of circular depressions in the outer surface thereof, sheet metal inserts in said circular depressions exerting pressure radially of the inserts against the ring, and a drum head secured to said ring by spot welded connection with said inserts.

8. In combination, a cast metal cylinder having an annular series of spaced shallow cylindric recesses in its side surface, sheet metal discs filling said recesses flush with said surface and exerting sufficient pressure radially of the discs against the recess sides to hold the discs in place, and a sheet-metal member telescoping the cylinder and discs and spot welded to the discs.

WARREN H. FARR.